United States Patent
Renaud et al.

(10) Patent No.: US 10,677,408 B2
(45) Date of Patent: Jun. 9, 2020

(54) OPTICAL MODULE FOR A MOTOR VEHICLE

(71) Applicant: VALEO VISION, Bobigny (FR)

(72) Inventors: Pierre Renaud, Bobigny (FR); Alexandre Joerg, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/245,985

(22) Filed: Jan. 11, 2019

(65) Prior Publication Data
US 2019/0219241 A1   Jul. 18, 2019

(30) Foreign Application Priority Data
Jan. 12, 2018   (FR) .................................... 18 50248

(51) Int. Cl.
| | |
|---|---|
| *F21S 41/24* | (2018.01) |
| *F21S 41/151* | (2018.01) |
| *F21S 41/663* | (2018.01) |
| *F21S 41/265* | (2018.01) |
| *F21S 41/143* | (2018.01) |

(Continued)

(52) U.S. Cl.
CPC ................ *F21S 41/24* (2018.01); *B60Q 1/04* (2013.01); *F21S 41/143* (2018.01); *F21S 41/151* (2018.01); *F21S 41/265* (2018.01); *F21S 41/663* (2018.01); *F21Y 2115/10* (2016.08)

(58) Field of Classification Search
CPC ........ F21S 41/24; F21S 41/143; F21S 41/265; F21S 41/663; F21S 41/151; B60Q 1/04
See application file for complete search history.

(56) References Cited

U.S. PATENT DOCUMENTS

| | | | |
|---|---|---|---|
| 2009/0073712 A1 | 3/2009 | Yamamura et al. | |
| 2015/0226395 A1* | 8/2015 | Taudt | F21S 41/24 362/511 |
| 2017/0089536 A1 | 3/2017 | Courcier et al. | |

(Continued)

FOREIGN PATENT DOCUMENTS

| | | |
|---|---|---|
| DE | 10 2012 213 843 B3 | 9/2013 |
| DE | 20 2017 005 367 U1 | 12/2017 |

(Continued)

OTHER PUBLICATIONS

French Preliminary Search Report dated Sep. 25, 2018 in French Application 18 50248, filed on Jan. 12, 2018 (with English Translation of Categories of Cited Documents).

*Primary Examiner* — Alan B Cariaso
(74) *Attorney, Agent, or Firm* — Oblon, McClelland, Maier & Neustadt, L.L.P.

(57) ABSTRACT

An optical module for a motor vehicle including a first optical element including light guides and a projection optic arranged at a distance from the first optical element and having a longitudinal optical axis. The light guides are aligned in a series, perpendicular to the longitudinal optical axis and in a transverse direction, and they include first light guides and second light guides. The first light guides are arranged successively with respect to each other by being interposed between the second light guides, the first light guides each having a transverse dimension less than the equivalent transverse dimension of each of the second light guides. The first light guides are predominantly offset transversely with respect to the longitudinal optical axis.

20 Claims, 4 Drawing Sheets

Figure 1:
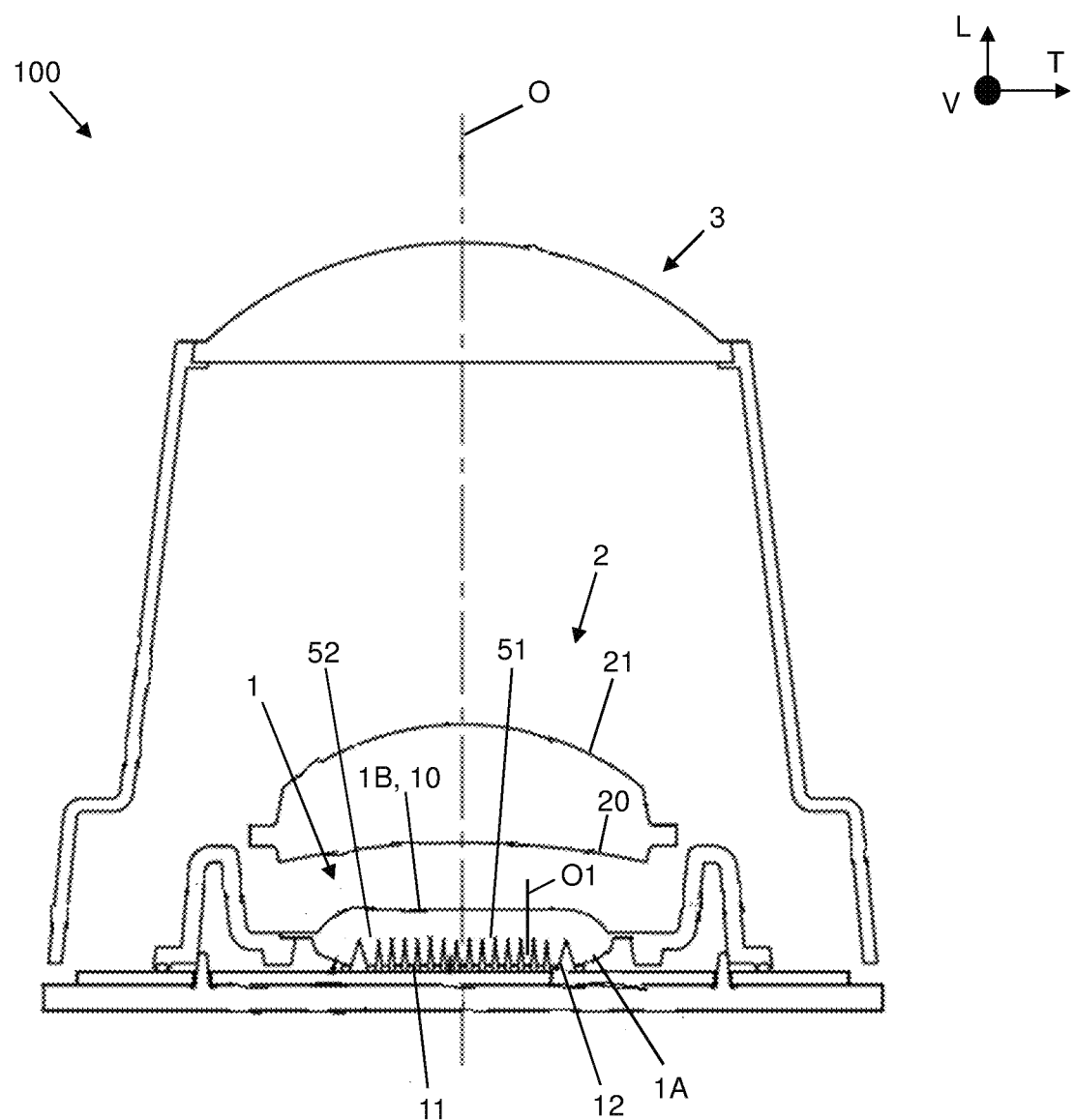

(51) Int. Cl.
*B60Q 1/04* (2006.01)
*F21Y 115/10* (2016.01)

(56) References Cited

U.S. PATENT DOCUMENTS

2017/0114976 A1* 4/2017 Beev ................. F21S 41/24
2018/0245760 A1* 8/2018 Kanayama ........... F21S 41/143
2018/0328562 A1* 11/2018 Taudt ................ F21S 41/143

FOREIGN PATENT DOCUMENTS

EP  2 037 167 A2  3/2009
EP  3 147 557 A1  3/2017

* cited by examiner

OPTICAL MODULE FOR A MOTOR VEHICLE

The present invention relates to an optical module for a motor vehicle, capable of generating a segmented light beam. The present invention further relates to a motor vehicle provided with a headlight comprising at least one such optical module.

In this context, motor vehicles are provided with optical modules capable of emitting longitudinally forwards a segmented light beam, referred to as a "multibeam" or "pixel beam", e.g. in a line of rectangular segments or even in multiple lines of square or rectangular segments. The projected segmented light beam, composed of a plurality of juxtaposed or overlapping elementary beams, corresponds to the projection onto a road scene of the image of an array formed by the rectangular section output faces, of light guides respectively associated with primary elementary light sources arranged in series. The segmented light beam, i.e. composed of a plurality of elementary beams, forms an adaptive light beam in that, by selectively switching on or switching off each of the primary elementary light sources, it is possible to modify the shape of the projected segmented light beam and specifically light certain areas of the road ahead of the vehicle, while leaving other areas in the dark, this in order not to dazzle a detected vehicle.

Such an optical module is notably used in lighting devices arranged at the front of the vehicle for performing an adaptive lighting function also referred to as "ADB", an abbreviation of "Adaptive Driving Beam". Such an adaptive lighting function is intended to automatically detect a road user likely to be dazzled by a lighting beam emitted as a high beam by a headlight of the vehicle and to modify the shape of this lighting beam so as to create an area of shadow forming a dark tunnel where the detected user is located while continuing to light the road over a wide range on each side of the user. According to regulations, the shadow area must be created laterally with respect to the optical axis, so as, for example, to prevent dazzling another vehicle travelling in the opposite direction at 50 metres. This shadow area may thus be formed according to the current European Regulation R123 in force, with a transverse offset of 2.8° to 4° and a vertical offset of 0.57° with respect to the intersection of the horizontal and vertical lines. It will be appreciated that this information is given by way of example and that it could change from one regulation to another.

The advantages of this adaptive lighting function are manifold: ease of use, better visibility compared with low beam lighting, greatly reduced risk of dazzling, safer driving.

More particularly, such an optical module generally comprises, in addition to the previously mentioned array of primary elementary light sources, generally formed by light-emitting diodes also referred to as "LED", a first optical element comprising a plurality of light guides arranged opposite the primary elementary light sources and a projection optic, configured for shaping the rays emitted by the primary light source and deflected by the first optical element, thereby forming a regulation lighting beam. The primary elementary light sources are arranged on a flat printed circuit board which extends in a plane orthogonal to the direction of projection of the segmented light beam. The light guides of the first optical element extend overall longitudinally, having at their longitudinal ends an input face for the light rays emitted by the primary elementary light sources and an output face for these light rays, the first optical element being arranged with respect to the projection optic so that the output face of the light guides is arranged substantially in the object focal plane of the projection optic.

The light guides are intended to shape the light rays emitted by the primary elementary light sources into a focussed pencil beam in the form of a generally rectangular or square pixel. The output faces of the light guides, arranged substantially in the object focal plane of the projection optic, form an array of secondary elementary light sources capable of being imaged to infinity by the projection optic.

Such an optical module requires that the projected image of the secondary elementary light sources has a light distribution and a controlled sharpness so that the segmented light beam formed by the assembly of images of the secondary elementary light sources is homogeneous. This is to ensure that the driver of the vehicle is not disturbed by variations in lighting due to dispersions of light intensity, e.g. in the areas where multiple images of secondary elementary light sources overlap.

As may have been previously noted, the adaptive lighting function known as ADB mainly avoids dazzling the driver located in the dark area while remaining in a lighting intensity mode close to the high beam, via the formation of a dark strip in the projected segmented beam after one or more primary elementary light sources are switched off. When all the primary elementary light sources are switched on, the projected segmented beam corresponds to the light beam of the high beam, lighting the road scene in an overall manner. In order to comply with the regulations relating to high beam lighting, this overall light beam must have a maximum and sufficient intensity at its centre. In this known context, provision is made to arrange the light guides of the first optical element and the primary elementary light sources so that the light intensity centred on the longitudinal axis is maximum. More particularly, it is known to arrange the first optical element in the optical module so that the light guides participating in the formation of high resolution secondary elementary light sources are arranged on the optical axis of the optical module, in order that the images of the highest resolution pixels are projected onto the road scene at the centre of the beam. It will be appreciated that a high resolution secondary elementary light source has a surface area at the output of the first optical element that is smaller than the surface area of a neighbouring source of lower resolution, and that a high resolution secondary elementary light source is formed at the output face of a light guide having an output surface area, and by extension an input surface area, which is smaller than the input and output surface areas of a neighbouring guide.

However, in such optical modules including light guides, the projected segmented light beam has a high level of parasitic brightness, notably under the effect of an optical phenomenon, known as crosstalk, which is due to the diffusion of the light emitted by the primary elementary light sources in all directions and to the distance between these primary elementary light sources and the light guides. More particularly, rays emitted by a primary elementary light source are directed mainly towards the light guide arranged directly opposite this primary elementary light source, but it should be noted that a very small portion of these rays is directed towards the neighbouring light guides into which they penetrate by refraction via a lateral face. This portion of rays emitted by a given source is caused to emerge from the first optical element at the output faces of the light guides which do not correspond to the input face opposite the primary elementary primary source. This parasitic light is particularly troublesome when it is wanted to implement the dark strip specific to the operation of adaptive lighting, since the rays emitted by sources that are not switched off may emerge from the first optical element at an output face of a guide corresponding to light source that is switched off. Clearly this phenomenon is amplified when the input face of a light guide is small, and therefore is amplified for "high resolution" secondary elementary light sources.

However, the creation of a dark strip in the projected segmented beam meets regulatory constraints which notably require, as previously mentioned, that this dark strip is produced with a transverse offset of 2.8° to 4° with respect to the longitudinal axis. The result is that the light sources that allow the projection of light between the optical axis and this dark strip remain switched on during the creation of the dark strip, it having been previously specified that these light sources centred on the optical axis are the corresponding light sources of the high resolution elementary secondary sources, more conducive to the appearance of the parasitic phenomenon previously described.

To solve this problem, provision has already been made to arrange between each light guide an opaque shutter wall, arranged parallel to the optical axis of the optical module, to prevent the rays emitted by a light source that do not penetrate into the light guide directly opposite this light source from being able to penetrate into a neighbouring light guide with which it is not associated. While it may be considered effective, this solution involves the manufacture and the presence of additional components in the module, which is detrimental to the weight and cost of the module, and it complicates the module assembly operations.

The invention fits into this context and aims to provide an optical module with a particular arrangement so as to remedy this drawback.

The invention thus provides an optical module for a motor vehicle including a first optical element comprising light guides and a projection optic arranged at a distance from the first optical element and having a longitudinal optical axis, the light guides being aligned in a series, perpendicular to the longitudinal optical axis and in a transverse direction, the light guides comprising first light guides successively arranged with respect to each other by being interposed between second light guides, the first light guides each having a transverse dimension less than the equivalent transverse dimension of each of the second light guides.

According to the invention, the first light guides are predominantly transversely offset with respect to the longitudinal optical axis.

Equivalent transverse dimension is understood to mean that the variation in the transverse dimension between the first and second light guides may be measured for an input face or an output face of these guides, as long as the comparison is made on the same faces from one guide to another.

According to a series of features that may be taken in combination or independently from each other:
- at least one third of the first light guides are offset with respect to the longitudinal optical axis,
- the first light guides form a series arranged with respect to the longitudinal optical axis so that all of the first light guides are located on the same side of the longitudinal optical axis,
- the first optical element successively includes second light guides forming a first subseries of two to four second light guides, first light guides forming a second subseries of three to eight first light guides, and second light guides forming a third subseries of four to six second light guides,
- a median longitudinal axis of the first light guides is offset transversely with respect to the longitudinal optical axis of the optical module by a value at least equal to 0.5° and may be between 0.5° and 5°; more particularly, the median longitudinal axis of the first light guides is offset transversely with respect to the longitudinal optical axis of the optical module by a value of between 2° and 5°, which makes it possible to cover the range of angular values as previously described with reference to the European standards for the formation of a shadow zone to prevent dazzling another vehicle; it will be understood, of course, that this range of values may change depending on the applicable regulation; median longitudinal axis is understood to mean a longitudinal axis, parallel to the longitudinal optical axis of the optical module, which passes through the centre of the transverse series of the first light guides,
- the first light guides and the second light guides together form an array mainly taking the form of a two-dimensional matrix perpendicular to the longitudinal optical axis of the optical module, this longitudinal optical axis substantially passing through the middle of said matrix with respect to the transverse direction,
- each of the light guides comprises an input face for light rays emitted by an associated primary elementary light source and an output face for light rays which is arranged in a focal plane of the projection optic,
- the input face of a first light guide has a transverse dimension less than the transverse dimension of the input face of a second light guide,
- the output face of a first light guide has a transverse dimension less than the transverse dimension of the output face of a second light guide,
- the primary elementary light sources are arranged in a plane parallel to the orthogonal emission plane, all the light guides having an identical or almost identical length along the longitudinal optical axis, it being understood that the light guides arranged at each of the ends of the series may be longer,
- the first optical element is made in a block comprising the plurality of the light guides, said first optical element having a common output face for light rays caused to pass through one or other of the light guides,
- a second optical element may be arranged between the first optical element and the projection optic,
- the first light guides are each associated with at least one elementary light source for the purpose of projecting first elementary beams and wherein the second light guides are each associated with an elementary light source for the purpose of projecting second elementary beams, the projection optic allowing the projection along the longitudinal axis of the vehicle of a segmented light beam formed by the first elementary beams and the second elementary beams, and the first elementary beams are predominantly offset with respect to the longitudinal axis of the vehicle,
- the optical module includes a pulse width modulation unit configured for controlling at least some of the elementary light sources associated with the first light guides so that the first elementary beams and the second elementary beams arranged at the centre of the segmented light beam have the same light intensity.

The subject matter of the invention is also a motor vehicle comprising at least one headlight including an optical module as previously described.

The vehicle may have a median elongation axis parallel to the direction of travel of the vehicle, and comprising at least one headlight including an optical module as described above, and the at least one headlight may be a left headlight, the module then being arranged according to the invention in that the first light guides are predominantly located between the longitudinal optical axis and the median longitudinal axis of the vehicle.

Figure 2:
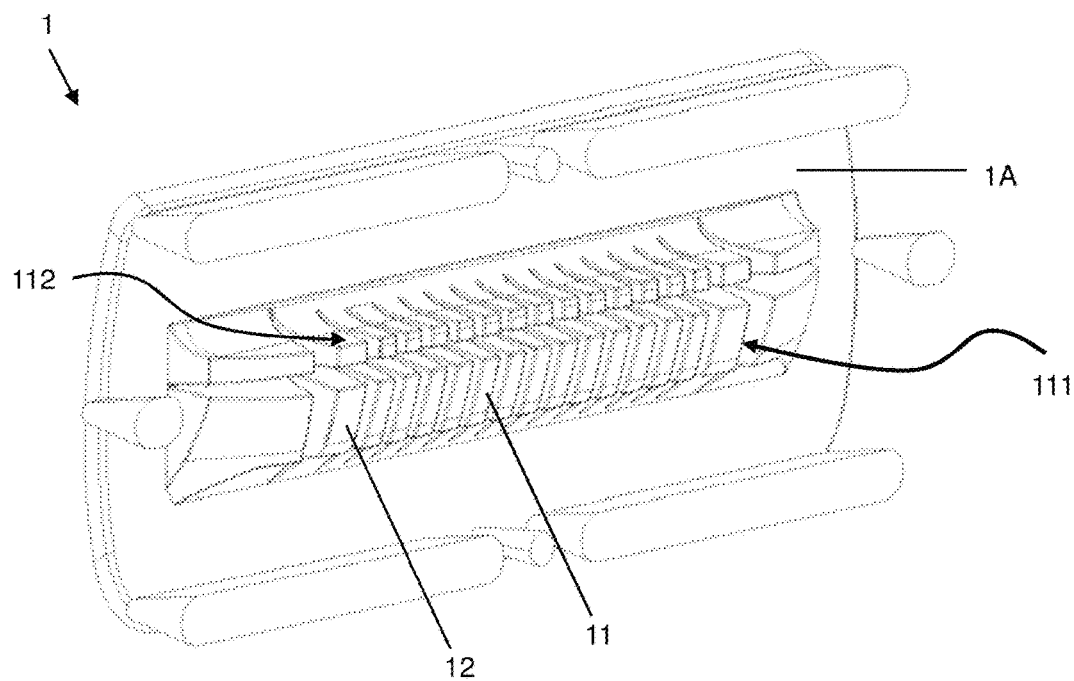
Figure 3:
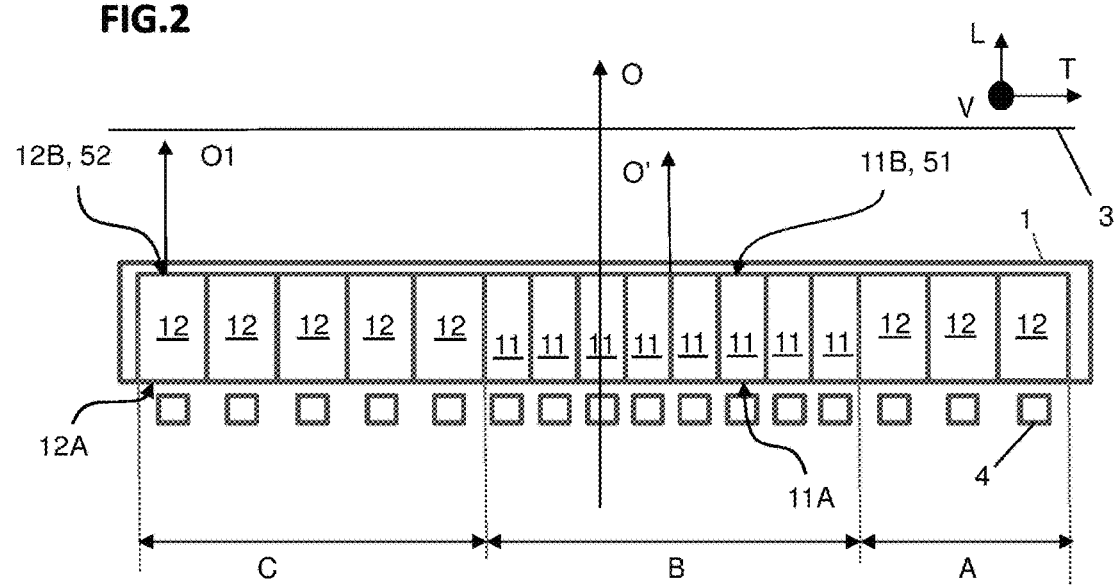
Figure 4:
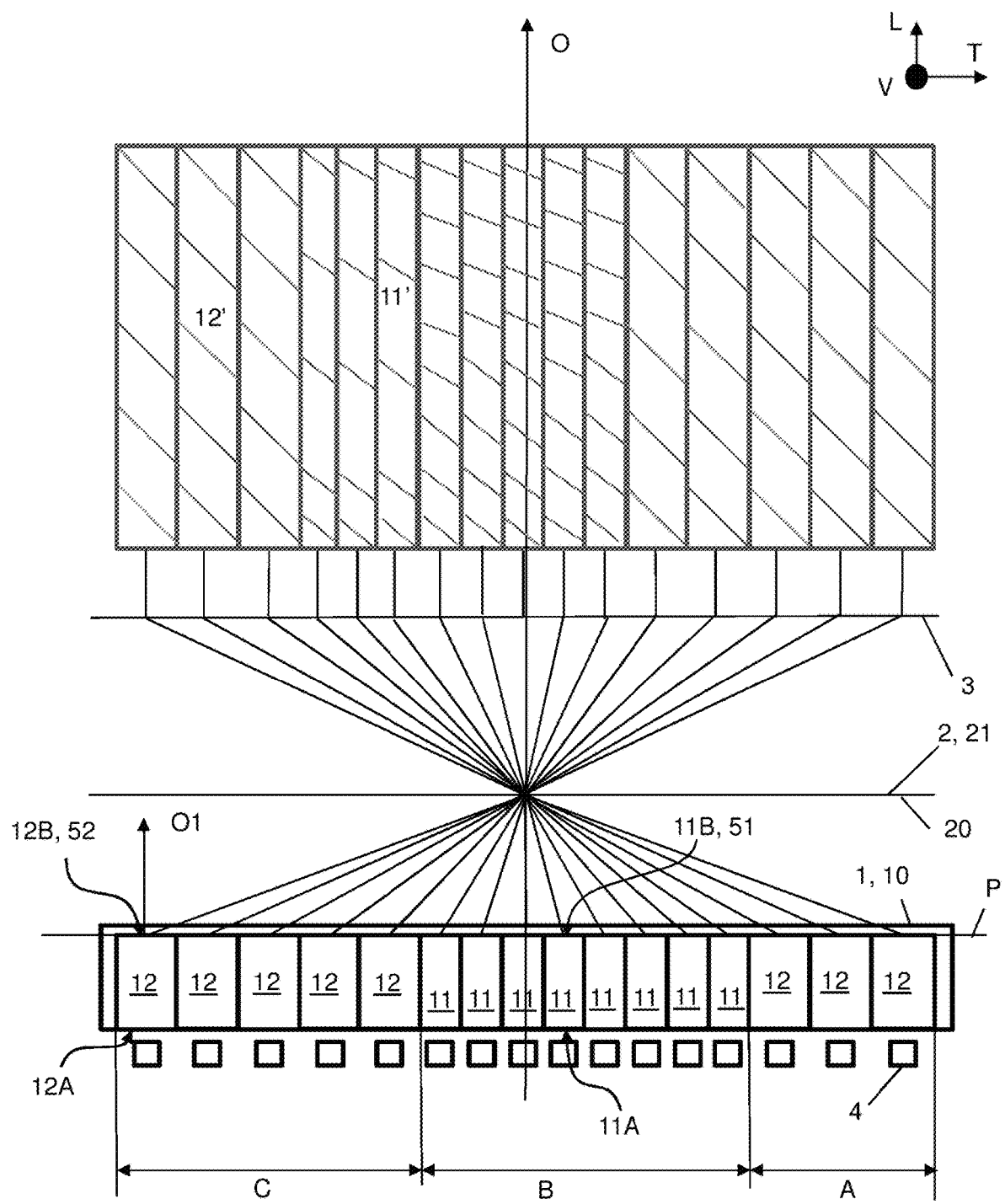
Figure 5:
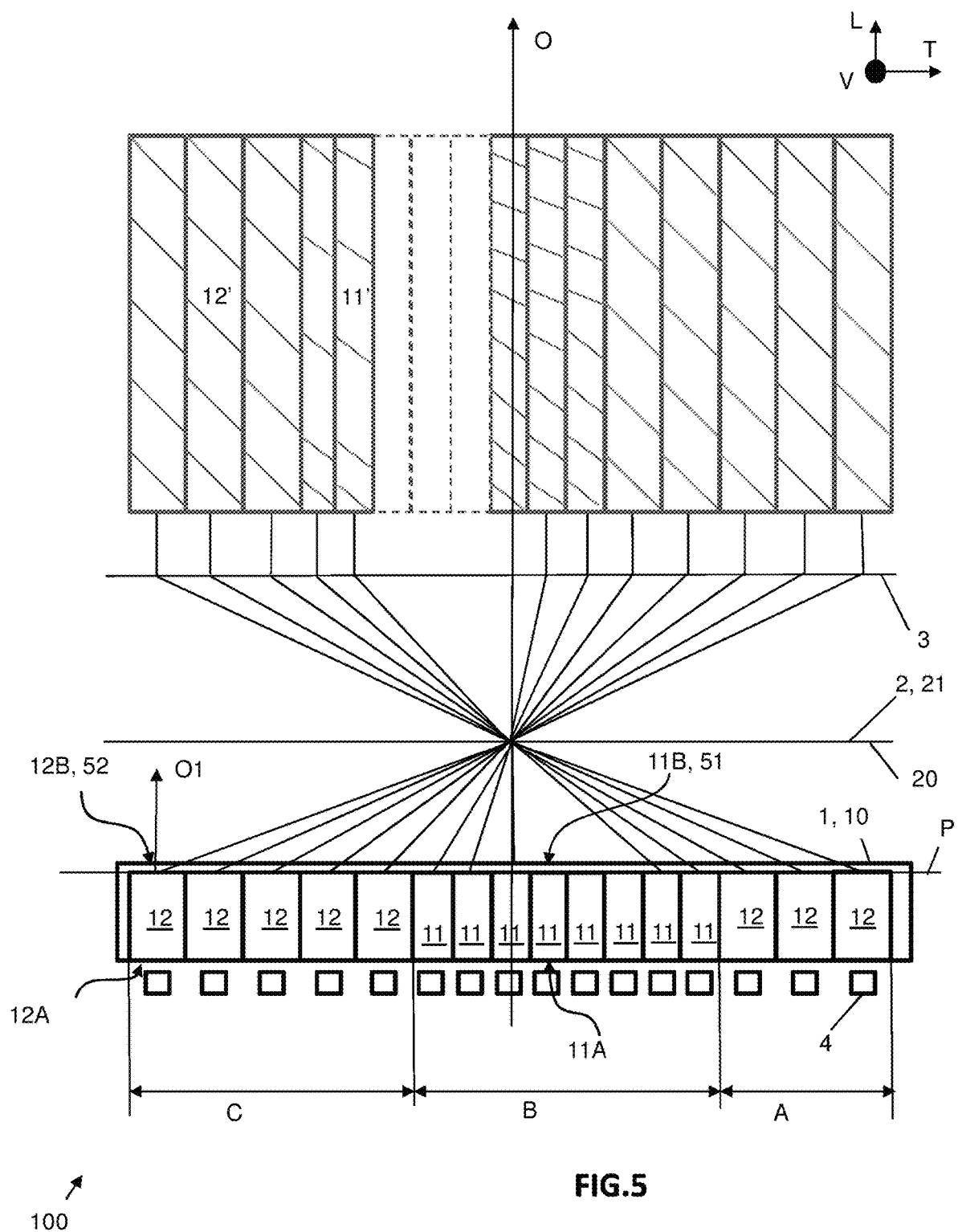

Other features, details and advantages of the invention will emerge more clearly on reading the description given below by way of illustration with reference to drawings in which:

FIG. 1 illustrates a schematic sectional top view of an optical module according to the invention mainly including a first optical element, a second optical element and a projection optic along a longitudinal projection axis, FIG. 2 illustrates a perspective view of a first optical element capable of being fitted in an optical module in conformity with that illustrated in FIG. 1, said first optical element including a plurality of light guides, FIG. 3 is a schematic top view illustrating a distribution of the light guides of the first optical element with respect to the optical axis of a projection optic illustrated downstream of the first optical element, FIG. 4 is a view similar to that of FIG. 3, illustrating the path of the light rays in the optical module for projecting a segmented beam, FIG. 5 illustrates a view similar to FIG. 4 wherein first light guides are switched off for forming a dark tunnel in the segmented projected beam.

In the rest of the description, the following non-restrictive orientations will be adopted:

longitudinal L, along the longitudinal optical axis of the projection optic of the optical module and the direction of travel of the associated vehicle and oriented from the rear forwards relative to the normal direction of travel of the vehicle;

vertical V, along the axis perpendicular to the ground on which the vehicle is travelling and oriented from bottom to top, the vertical direction V being used as a geometric reference without necessarily being related to the direction of gravity; and transverse T, along an axis perpendicular to the longitudinal and vertical axes previously described and oriented from left to right.

Referring to FIGS. 1 and 4 together, an optical module 100 is represented that is intended to be fitted to a headlight for a motor vehicle. The optical module 100 is intended to emit a segmented light beam oriented longitudinally forwards. It is an adaptive light beam which is composed of a plurality of elementary beams 11', 12' (seen in FIG. 4). Such an optical module 100 is notably capable of fulfilling an adaptive beam function, also known as "ADB" for "Adaptive Driving Beam", it being understood that it is also capable of fulfilling a directional lighting function, also known as "DBL" for "Dynamic Bending Light".

The headlight for a motor vehicle comprises at least one such optical module 100 and it is understood that for further implementing other lighting and/or signalling light functions, other optical modules may be arranged in the same headlight.

The optical module 100 mainly comprises primary elementary light sources 4, a first optical element 1 provided with light guides and a projection optic 3 which is arranged longitudinally forwards and at a distance from the first optical element 1, the projection optic 3 being formed so as to have a longitudinal optical axis O. Where appropriate, the optical module 100 comprises a second optical element 2, known as a field correction optical element, which is interposed between the first optical element 1 and the projection optic 3.

The primary elementary light sources 4 are formed by light-emitting diodes. The optical module 100 includes at least one row of primary elementary light sources 4 formed by a succession of light-emitting diodes here along the transverse direction T. The primary elementary light sources 4 are borne by a front face of a printed circuit board 5.

The printed circuit board makes it possible, both to power the light-emitting diodes and to bear a pulse width modulation unit for controlling the light intensity emitted by the light-emitting diodes in order notably to provide a 100% light intensity operating mode and a degraded mode wherein the emitted light intensity is, for example, 80%, as will be described in more detail below.

The primary elementary light sources 4 emit light rays in all directions and the arrangement of the light-emitting diodes forming these sources on the printed circuit board generates a very open light emission cone, e.g. of the Lambertian type.

In the context of an optical module 100 aimed at delivering a segmented light beam, each primary elementary light source 4 is associated with a light guide 11, 12 specifically arranged in the first optical element 1 for formatting at its output face 11B, 12B, i.e. its free end opposite the primary elementary light source, a secondary image, or secondary elementary light source 51, 52, forming a square or rectangular shaped pixel. For this purpose, the first optical element 1 is arranged longitudinally in front of the row of primary elementary light sources 4 for modifying the distribution of the emitted light rays.

The output faces 11B, 12B of the light guides are arranged on the object focal plane of the projection optic 3 of the optical module 100. It will then be appreciated that the first optical element 1 is arranged between the primary elementary light sources 4 and the projection optic 3.

Before describing the shape and the arrangement of the light guides in the first optical element 1 in more detail, a description will first be given of the elements arranged downstream of this first optical element, namely the field correction optical element 2 and the projection optic 3.

The projection optic 3 here is lens-shaped. In known way, the projection optic 3 comprises an object focal surface extending overall orthogonally to the longitudinal optical axis O intersecting it at the object focus of the projection optic 3 and each of the secondary elementary light sources 51, 52 is substantially located on this object focal surface of the projection optic, in order that these secondary sources are clearly imaged and that the segmented light beam projected onto the road scene via this projection optic has the desired light characteristics for the use thereof.

Theoretically, the projection optic 3 is supposed to have an object focal surface that is flat and perfectly orthogonal to the longitudinal optical axis O. However, in reality, it is known that the projection optic 3 has an object focal surface having a concave spherical curvature defect. Such a defect is called a Petzval field aberration.

For making it possible to correctly focus the projection optic 3 on the secondary elementary light sources 51, 52, a second optical element 2, known as a field correction optical element, is interposed between the emission plane P and the projection optic 3. This second optical element 2 is specifically designed for correcting the field curvature aberration of the projection optic 3.

The second optical element 2 is formed so that, seen from the first optical element 1, the image of the curved focal surface of the projection optic 3 by the second optical element 2 extends in an object focal plane coincident with an emission plane P into which the secondary elementary light sources 51, 52 emerge. The projection optic 3 will have been previously positioned so that the object focal surface is tangent with the emission plane P, the second optical element 2 having the effect of flattening out the object focal surface towards the emission plane P.

The second optical element 2 is formed by at least one field correction lens also known as a "field flattener lens". In the illustrated example, the second optical element 2 comprises a single field correction lens, it being understood that this second optical element 2 could comprise a plurality of field correction lenses arranged in series along the optical axis, as well as other types of lenses for correcting other optical aberrations such as astigmatism or distortion, for example.

The second optical element 2 comprises an input face 20 for light rays which is arranged longitudinally at a distance from the emission pane P. The input face 20 of the second optical element 2 is arranged longitudinally at a distance from the output face 10 of the first optical element 1 and/or the output faces 11B, 12B of the light guides borne by this first optical element. This input face 20 of the second optical element 2 may have a curved, concave or convex shape at its centre close to the longitudinal optical axis O of the projection optic.

The second optical element 2 further comprises an output face 21 for light rays, which is arranged longitudinally facing and at a distance from the projection optic 3 and which has a convex shape.

Thanks to the arrangement of the second optical element 2 between the first optical element 1 and the projection optic 3, it is possible to produce short light guides 11, 12 having a length substantially identical from one transverse end to the other in the series. The first optical element 1 is thus easier to manufacture. It is notably possible to use materials that do not allow long light guides 11, 12 to be obtained by moulding. The first optical element 1 according to the invention is thus capable of being made of polycarbonate. Of course, it will be understood that a fortiori, the first optical element 1 produced according to the teachings of the invention may be made of glass, silicone, or even polymethylmethacrylate (PMMA) or any other material suitable for producing light guides 11, 12.

Referring to FIGS. 1 and 4 together, the first optical element 1 comprises a rear portion 1A and front portion 1B forming a single-piece assembly.

The front portion 1B is a portion for shaping the elementary beams 11', 12' emitted by the secondary elementary light sources 51, 52. The front portion 1B comprises the common output face 10 of the light rays of the first optical element 1, so that it makes it possible, for example, to spread out the elementary beams 11', 12' vertically and/or horizontally. This front portion 1B is made of a piece with the light guides 11, 12 so that the first optical member 1 is made in one block.

The first optical element 1 comprises, in its rear portion 1A facing towards the primary elementary light sources 4 opposite the projection optic 3, an array that is formed of a plurality of light guides 11, 12. The array is aligned mainly in a transverse direction T. More particularly, the array here takes the form of a matrix with two transverse rows 112 of light guides 11, 12 arranged one above the other, in a vertical direction perpendicular to the extension direction of the rows of light guides. Each light guide 11, 12 is associated with at least one primary elementary light source 4, it being understood that all or part of the guides, and notably the light guides arranged at the transverse ends of the rows, may be associated with a plurality of primary elementary light sources 4.

A first row 111, here the lower row in FIG. 2, is arranged opposite light-emitting diodes forming primary elementary light sources 4 for producing a first set of elementary beams, as seen in FIGS. 4 and 5, the transverse juxtaposition of which assists in forming an upper portion of the segmented beam projected onto the road, i.e. a portion of the long range beam. The second row 112, here the upper row in FIG. 2, is arranged opposite light-emitting diodes forming primary elementary light sources 4 for producing a second set of elementary beams, not represented in the figures, and the transverse juxtaposition of which assists in forming a lower portion of the segmented beam projected onto the road.

The remainder of the description will more specifically describe the arrangement of one of these rows of light guides 11, 12, namely the lower row of light guides 11, 12 represented in FIG. 2, it being understood that it is this row that is capable of emitting a long range beam that should be controlled to form a dark area. However, without departing from the context of the invention, the details of what follows may be applied to the second row of guides, and could be applied to other rows of guides if the optical module is configured so that at least three rows of guides are provided.

The lower row comprises two types of light guides 11, 12. More particularly, the lower row includes first light guides 11 and second light guides 12 which are distinguished from each other by their transverse dimension, i.e. the dimension along the main direction of the series of guides. The first light guides 11 are arranged successively with respect to each other by being interposed between second light guides 12. And the transverse dimension of the input faces 11A, respectively the output faces 11B, of the first light guides 11 is smaller than the transverse dimension of the input faces 12A, respectively the output faces 12B, of the second light guides 12.

In other words, the lower row of light guides 11, 12 arranged in the first optical element 1 is configured so that multiple light guides 11, 12 succeed each other in a transverse series, at least one light guide 11 of a first type being distinguished from the others by a smaller transverse dimension, and this or these light guides 11 of a first type are arranged in a central position, surrounded by light guides 12 of a second type, i.e. with a transverse dimension larger than that of the light guides 11 of the first type. Central position of the first light guides 11, or light guides of the first type, is understand to mean that second light guides 12, or light guides of the second type, are present transversely on each side of these light guides 11 of the first type, without this involving a symmetrical distribution of the light guides 12 of the second type around the light guides 11 of the first type. Furthermore, it should be noted that light guides of the second type may have different dimensions between them, and notably the guides arranged at the transverse ends of the row which are much wider and flared.

FIG. 3 schematically represents a transverse series of light guides forming a row, here the first row, or lower row, 111 and their position with respect to the longitudinal optical axis O defined by the shape of the projection optic 3. According to the invention, the first light guides 11 are predominantly offset transversely with respect to this longitudinal optical axis O. In other words, a majority of first light guides are arranged to the right (as seen in FIGS. 3 to 5), respectively to the left of the longitudinal optical axis, seen from inside the vehicle, in the case of applying the optical module in a left-hand drive vehicle, i.e. for traffic to the right, respectively a right-hand drive vehicle, i.e. for traffic to the left. A description will be given later of the path of the light rays outputted from these light guides through the projection optic, to illustrate the utility of such a transverse offset of the light guides.

According to the illustrated embodiment, the transverse row of light guides is formed successively by a first subseries A of three second light guides 12, then by a second subseries B of eight first light guides 11, and finally by a third subseries C of five second light guides 12.

Each light guide 11, 12 extends along a longitudinal main axis O1, substantially parallel to the longitudinal optical axis O, from an input face 11A 12A for light rays emitted by the primary elementary light sources 4, up to the output face 11B, 12B for the previously described light rays. Each light guide 11, 12 is designed to guide the light rays entering through the input face 11A, 12A up to the output face 11B, 12B so as to form one of said secondary elementary light sources 51, 52.

More particularly, the input faces 11A, 12A of the light guides 11, 12 are arranged in a common plane which is substantially parallel to the plane of the printed circuit board. When the first optical element 1 is arranged in the optical module 100, each input face 11A, 12A is thus positioned longitudinally facing and close to an associated primary elementary light source 4, so that the major portion of the light rays emitted by each primary elementary light source 4 enters the associated light guide 11, 12.

The output faces 11B, 12B of the light guides 11, 12, forming the secondary elementary light sources 51, 52, are arranged in an emission plane P orthogonal to the longitudinal optical axis O. The emission plane P is the object focal plane of the projection optic 3, in order that the image of the secondary elementary light sources 51, 52 are projected to infinity. The representation here is schematic with a straight plane, but the person skilled in the art will know how to provide, during the implementation of the invention, a curved profile for this emission plane P.

As previously described, the transverse dimension of the input faces 11A, respectively the output faces 11B, of the first light guides 11 is smaller than the transverse dimension of the input faces 12A, respectively the output faces 12B, of the second light guides 12. More particularly, the transverse dimension of the output face of the first light guides is smaller than the transverse dimension of the output face of the second light guides, so as to provide higher resolution pixels at the output of the first light guides than at the output of the second light guides.

Thus, each output face 11B of the first light guides 11 has a section suitable for producing a first elementary "high resolution" beam 11', with a high light intensity, emitted from a first secondary elementary light source 51. Similarly, the second light guides 12 each have a section suitable for producing a second elementary "low resolution" beam 12, with a low light intensity, emitted from a second secondary elementary light source 52. It is understood that the terms high and low resolution, or high and low light intensity, are chosen for characterizing that one of the elementary beams has a better resolution than the other, without it being a matter of exceeding a given threshold.

Each first elementary beam and each second elementary beam is of the desired shape for the function of the optical module 100 fitted to the headlight.

The output faces 11B, 12B of the light guides 11, 12 thus form a row of secondary elementary light sources 51, 52, each of which is capable of emitting an elementary beam in a main longitudinal projection direction from the emission plane P, for the projection of a regulation overall beam by the projection optic. The output faces 11B, 12B forming the secondary elementary light sources 51, 52 are arranged immediately close to each other, e.g. with a 0.1 mm gap between them.

Furthermore, it should be noted that the light guides 11, 12 illustrated in FIG. 3 are represented schematically. In practice, the first optical element is formed by a one-piece assembly obtained from a single mould and the light guides 11, 12 all have a flared shape so that the transverse dimension of the input face 11A, 12A is slightly less than the transverse dimension of the output face 11B, 12B, with an equivalent clearance angle for each of the light guides. Accordingly, the difference in transverse dimension between the aforementioned first and second light guides at the output faces of the light guides is found again in the input faces of these guides. A high resolution pixel, with a small output face 11B for forming a small secondary elementary light source 51, thus corresponds to a guide with a small input face, alongside which the rays emitted by the corresponding primary elementary light source 4 may pass.

It is understood that the output face 11B of a first light guide 11 corresponds to a first secondary elementary light source 51 and that the output face 12B of a second light guide 12 corresponds to a second secondary elementary light source 52.

The first light guides 11 and the second light guides 12 are aligned in a transverse series, perpendicular to the longitudinal optical axis O, with the first, second and third subseries A, B, C of light guides 11, 12 which are successively arranged with respect to each other in the transverse direction T.

As noted previously, according to the invention, the first light guides 11 are predominantly offset transversely with respect to the longitudinal optical axis O of the projection optic 3, i.e. of the optical module. Such an offset is established when the projection optic 3 and the first optical element 1 are in position in the optical module 100. The first light guides 11, here eight in number, are arranged in series so that a median longitudinal axis O' may be defined passing through the centre of this series of the first light guides, i.e. at the junction between the fourth and fifth light guides in this series. As illustrated in FIG. 3, this median longitudinal axis O' is offset transversely with respect to the longitudinal optical axis O with an offset value of A, the longitudinal optical axis O passing substantially through the middle of the transverse series of light guides of the same row.

More particularly, according to this embodiment, the first optical element 1 comprises eight first light guides 11 arranged so that, seen from inside the vehicle two first light guides 11 are located to the left of the longitudinal optical axis O, five first light guides 11 are located to the right of the longitudinal optical axis O and a first light guide 11 is located overlapping the longitudinal optical axis O. In accordance with what has been previously described, it is understood that in a version with traffic to the left of the vehicle, the arrangement of the first light guides would be reversed.

The projection optic 3 is arranged longitudinally at a distance in front of the emission plane P. The projection optic 3 is configured for projecting, along a longitudinal axis of the vehicle, an image of the secondary elementary light sources for forming first and second elementary beams 11', 12' oriented forwards and the combination of which makes it possible to form the segmented light beam on the road scene.

The segmented light beam is thus formed by first and second elementary beams 11', 12' successively aligned with respect to each other.

As can notably be seen in FIGS. 4 and 5, the particular arrangement of the light guides with respect to the longitudinal optical axis involves a particular arrangement of the elementary beams with respect to the longitudinal axis of the vehicle, substantially parallel to the optical axis of the optical module. In the illustrated example, and in the same transverse direction T defined by the arrangement of the first, second and third subseries A, B, C of light guides 11, 12, it can be observed that the segmented light beam is formed successively by second elementary beams 12' resulting from the rays emitted by second secondary elementary sources 52 associated with the first subseries A of second light guides, then by first elementary beams 11' resulting from the rays emitted by first secondary elementary light sources 51 associated with the second subseries B of first light guides, and finally by second elementary beams 12' resulting from the rays emitted by second secondary elementary light sources 52 associated with third subseries C of second light guides.

In this segmented light beam projected onto the road by the projection optic 3, in a similar way to the transverse offset of the light guides with respect to the longitudinal optical axis O, the first elementary beams 11' are predominantly transversely offset with respect to the longitudinal axis of the vehicle. In other words, a majority of the first elementary beams 11' are located on one side of the longitudinal axis and a minority of the first elementary beams 11' are located on the other side of the longitudinal axis. As illustrated notably in FIG. 4, and due to the direct imaging of this optical module, it is understood that the transverse offset with respect to a longitudinal axis is reversed depending on whether the light guides, predominantly offset here on the right seen from inside the vehicle, or the corresponding elementary beams forming part of the segmented light beam projected onto the road, predominantly offset here on the left seen from inside the vehicle, are considered for forming a dark tunnel with first elementary beams 11' which is present according to regulations to the left of the optical axis with an offset of the order of at least 0.5°, and more particularly of the order of 2° to 5° in the case of traffic to the right so as not to dazzle a vehicle 50 metres away.

The invention is, however, not limited to this illustrated configuration and it may be provided that the first light guides 11 and the corresponding first elementary beams 11' are all offset with respect to the longitudinal optical axis O, respectively on one side then the other. In other words, in this variant, not represented, all the first light guides 11 are located on the same side of the longitudinal optical axis O, which furthermore passes as previously described through the centre of the transverse series of the light guides, and all the first elementary beams 11' are located on the other side of the longitudinal optical axis O.

The application of the invention will now be described, referring more particularly to FIGS. 4 and 5.

In projecting onto a road scene, each secondary elementary light source 51, 52 allows the projection of an elementary beam 11', 12' making it possible to light an area of the road scene. The areas overlap slightly so as to ensure homogeneous lighting. Each primary elementary light source 4 is controlled individually so as to be able to selectively light each of the areas of the road scene. It is understood that switching on a primary elementary light source 4 generates an image pixel on a secondary elementary light source 51, 52 thus lighting an area of the road scene, and conversely switching off the same primary elementary light source 4 generates an output face of the dark light guide, i.e. a secondary elementary light source 52 is switched off, thus generating a dark strip in the segmented light beam.

FIG. 4 illustrates the case where all the primary light sources are switched on and therefore the case of high beam lighting where the whole of the road scene is lit up in front of the vehicle provided with the optical module according to the invention, and FIG. 5 illustrates the case of lighting with a partial beam so as not to dazzle the driver of a motor vehicle crossing the path of the vehicle provided with the optical module according to the invention. The case of partial lighting is automatically implemented as soon as a vehicle is detected at a certain distance from the vehicle, and more particularly when this oncoming vehicle is at a distance such that it is lit by one of the segments projected on the road scene to the left of the longitudinal axis.

A dark tunnel is thus formed in the beam to prevent dazzling the detected vehicle, this being more particularly achieved by switching off the specific primary elementary light sources 4 corresponding to the position of the vehicle detected on the road. It will be noted that in the case illustrated in FIG. 5, seen from inside the vehicle, only the first three light guides 11 located to the right of the optical axis are switched off for generating a dark tunnel of transverse dimension corresponding to three first elementary beams 11', to the left of the optical axis.

According to the invention, it should be noted that the dark tunnel is created by switching off primary light sources associated with a high resolution pixel and this is particularly advantageous in that it avoids a high parasitic brightness level. Indeed, as noted previously, this phenomenon of parasitic brightness is all the more present the narrower the input face of the light guide opposite its corresponding primary elementary light source, since the rays may be more easily propagated alongside the guide arranged opposite the source. In other words, the phenomenon of the occurrence of parasitic brightness is potentially higher for the first light guides than for the second light guides, it being recalled that the first light guides have a transverse dimension of a value less than that of the transverse dimension of the second light guides. It is understood then that the fact of providing to associate high resolution pixels with producing or not producing the dark tunnel makes it possible to limit the number of high resolution pixels switched on when the dark tunnel is implemented and therefore to limit the potential parasitic phenomenon. Furthermore, such a configuration of the invention makes it possible to match high resolution pixels on each side of the dark tunnel and to refine the quantity and quality of light near the vehicle travelling in the dark tunnel, and therefore to improve the lighting around the vehicle without necessarily risking dazzling the driver.

When the monitoring module associated with the optical module determines that the risk of dazzling a driver has passed, the light sources are all reactivated so as to light the entire road scene. According to one feature of the invention, it should be noted that activating these light sources previously switched off and corresponding to the high resolution pixels, is achieved via the use of a pulse width modulation unit. Indeed, in standard lighting operation, i.e. when all the primary elementary light sources 4 are switched on, it is necessary to meet the regulation requiring that the maximum intensity of the projected segmented beam is centred on the longitudinal axis of the vehicle. It is therefore provided according to the invention to compensate for the predominant transverse offset of the high resolution pixels forming the first elementary beams 11' by reducing the intensity of at least some of the primary elementary light sources 4 associated with these high resolution pixels. By way of a non-restrictive example, the light intensity of these primary light sources may be reduced to 80% of their maximum intensity.

Accordingly, the emission intensity of the primary elementary light sources associated with the projection of the first elementary beams 11' is reduced so that they emit a light intensity substantially equal to the light intensity emitted by the primary elementary light sources associated with the projection of the second elementary beams 12'. Advantageously, this results in a spot of maximum intensity centred on the longitudinal axis that is enlarged compared to the spot of maximum intensity conventionally produced in the prior art. It is also possible to vary the light intensity of each of the primary elementary light sources in order that, in this context of a maximum intensity spot centred on the longitudinal axis of the vehicle, the intensity of the beam regularly decreases when moving away from this central spot.

It will be noted that the optical module 100 as it has just been described, with the light guides corresponding to the formation of the "high resolution" pixels, is also useful in developing a directional lighting function, also known under the term "DBL" for "Dynamic Bending Light". The utility of such a function lies in providing for swivelling the projected beam towards the inside of the bend in order to provide optimum visibility for the driver. According to the invention, rather than swivel the optical module as a whole to offset the optical axis of this module with respect to the median longitudinal axis of the vehicle corresponding to the general direction of travel thereof, the primary light sources are switched on selectively to decentre the segmented light beam projected by the value of the regulation offset for performing the DBL function, e.g. between 5° and 9° without this being restrictive of the invention. In other words, a number of primary elementary light sources are switched on, forming a first assembly centred on the longitudinal axis of the vehicle, when lighting the road scene in a straight line, with primary elementary light sources not used at the ends of the transverse series of these sources, and a similar number of primary elementary light sources is switched on when lighting the road on a bend with a transverse offset of the switched on assembly, which is no longer centred on the longitudinal axis of the vehicle. In the illustrated example, on a left-hand bend, the primary elementary light sources are switched on so as to offset the segmented light beam towards the left of the longitudinal axis, so that they are mainly the primary elementary light sources arranged on the right of the series that are switched on. Of course, a vehicle with right-hand traffic would involve the primary elementary light sources being switched on in reverse. It may then be ascertained that the series of light guides lit by the primary elementary light sources is centred on the first light guides 11, offset transversely according to the invention with respect to the longitudinal optical axis. As a result, when performing the DBL function, the light beam projected towards the inside of the bend has a centre at maximum light intensity, thereby improving the visibility of the driver.

Of course, the features, variants and different embodiments of the invention may be combined with each other, in various combinations, insofar as they are not incompatible with or exclusive of each other. Notably, variants of the invention may be imagined including only a selection of features described separately from the other features described, so long as, in accordance with the invention, first light guides corresponding to high resolution pixels are arranged in the middle of a transverse series of light guides so as to be predominantly offset transversely with respect to the longitudinal optical axis of the projection optic.

The invention claimed is:

1. An optical module for a motor vehicle, comprising:
a first optical element including light guides; and
a projection optic arranged at a distance from the first optical element and having a longitudinal optical axis,
wherein the light guides are aligned in a series perpendicular to the longitudinal optical axis and in a transverse direction,
wherein the light guides include a plurality of first light guides arranged successively with respect to each other by being interposed between a plurality of second light guides,
wherein the first light guides each have a transverse dimension less than the equivalent transverse dimension of each of the second light guides,
wherein the first light guides are offset transversely with respect to the longitudinal optical axis, and
wherein a longitudinal axis of each of the plurality of first light guides and the plurality of second light guides is substantially parallel to the longitudinal optical axis.

2. The optical module according to claim 1, wherein the first light guides form a series arranged with respect to the longitudinal optical axis so that all of the first light guides are located on the same side of the longitudinal optical axis.

3. The optical module according to claim 1, wherein the first optical element successively includes second light guides forming a first subseries of two to four second light guides, first light guides forming a second subseries of three to eight first light guides, and second light guides forming a third subseries of four to six second light guides.

4. The optical module according to claim 1, wherein a median longitudinal axis of the first light guides is offset transversely with respect to the longitudinal optical axis with a value of 0.5° to 5°.

5. The optical module according to claim 1, wherein the first optical element is made in a single block comprising the plurality of the light guides, said first optical element having a common output face for light rays caused to pass through one or other of the light guides.

6. The optical module according to claim 1, wherein a second optical element is arranged between the first optical element and the projection optic.

7. The optical module according to claim 1, wherein the first light guides are each associated with an elementary light source for the purpose of projecting first elementary beams and wherein the second light guides are each associated with an elementary light source for the purpose of projecting second elementary beams, the projection optic allowing the projection along the longitudinal optical axis of a segmented light beam formed by the first elementary beams and the second elementary beams, wherein the first elementary beams are predominantly offset with respect to the longitudinal optical axis.

8. The optical module according to claim 7, wherein the optical module includes a pulse width modulation unit configured for controlling at least some of the primary elementary light sources associated with the first light guides so that the first elementary beams and the second elementary beams arranged at the centre of the segmented light beam have the same light intensity.

9. A motor vehicle comprising at least one headlight including an optical module according to claim 1.

10. The motor vehicle according to claim 9 and having a median longitudinal axis parallel to the direction of travel of this vehicle, wherein the at least one headlight is a left headlight, the module being arranged according to the invention in that the first light guides are predominantly located between the longitudinal optical axis and the median longitudinal axis of the vehicle.

11. The optical module according to claim 2, wherein the first optical element successively includes second light guides forming a first subseries of two to four second light guides, first light guides forming a second subseries of three to eight first light guides, and second light guides forming a third subseries of four to six second light guides.

12. The optical module according to claim 2, wherein a median longitudinal axis of the first light guides is offset transversely with respect to the longitudinal optical axis with a value of 0.5° to 5°.

13. The optical module according to claim 2, wherein the first optical element is made in a single block comprising the plurality of the light guides, said first optical element having a common output face for light rays caused to pass through one or other of the light guides.

14. The optical module according to claim 2, wherein a second optical element is arranged between the first optical element and the projection optic.

15. The optical module according to claim 2, wherein the first light guides are each associated with an elementary light source for the purpose of projecting first elementary beams and wherein the second light guides are each associated with an elementary light source for the purpose of projecting second elementary beams, the projection optic allowing the projection along the longitudinal optical axis of a segmented light beam formed by the first elementary beams and the second elementary beams, wherein the first elementary beams are predominantly offset with respect to the longitudinal optical axis.

16. A motor vehicle comprising at least one headlight including an optical module according to claim 2.

17. The optical module according to claim 3, wherein a median longitudinal axis of the first light guides is offset transversely with respect to the longitudinal optical axis with a value of 0.5° to 5°.

18. The optical module according to claim 3, wherein the first optical element is made in a single block comprising the plurality of the light guides, said first optical element having a common output face for light rays caused to pass through one or other of the light guides.

19. The optical module according to claim 3, wherein a second optical element is arranged between the first optical element and the projection optic.

20. The optical module according to claim 3, wherein the first light guides are each associated with an elementary light source for the purpose of projecting first elementary beams and wherein the second light guides are each associated with an elementary light source for the purpose of projecting second elementary beams, the projection optic allowing the projection along the longitudinal optical axis of a segmented light beam formed by the first elementary beams and the second elementary beams, wherein the first elementary beams are predominantly offset with respect to the longitudinal optical axis.

* * * * *